(12) United States Patent
Dai et al.

(10) Patent No.: US 11,943,083 B1
(45) Date of Patent: Mar. 26, 2024

(54) PHYSICAL LAYER TRANSCEIVER WITH INCREASED NOISE AND INTERFERENCE TOLERANCE AND REDUCED LOSS

(71) Applicant: Marvell Asia Pte Ltd, Singapore (SG)

(72) Inventors: Shaoan Dai, San Jose, CA (US); Wensheng Sun, San Jose, CA (US); Xing Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/677,863

(22) Filed: Feb. 22, 2022

Related U.S. Application Data (60) Provisional application No. 63/152,224, filed on Feb. 22, 2021, provisional application No. 63/304,146, filed on Jan. 28, 2022.

(51) Int. Cl.
*H04L 25/497* (2006.01)
*H04L 25/49* (2006.01)

(52) U.S. Cl.
CPC ........ *H04L 25/497* (2013.01); *H04L 25/4904* (2013.01)

(58) Field of Classification Search
CPC .......................... H04L 25/497; H04L 25/4904
See application file for complete search history.

(56) References Cited

U.S. PATENT DOCUMENTS

| | | | | |
|---|---|---|---|---|
| 5,923,378 A | * | 7/1999 | Limberg | H04N 5/46 348/E5.077 |
| 6,011,812 A | * | 1/2000 | Laakso | H04B 1/71052 375/152 |
| 9,689,967 B1 | * | 6/2017 | Stark | G01S 7/0233 |
| 11,070,351 B1 | * | 7/2021 | Chepuri | H04L 25/4917 |
| 2008/0075151 A1 | * | 3/2008 | Fujiwara | G01S 5/0218 375/152 |
| 2010/0272150 A1 | * | 10/2010 | Kil | H04B 1/71637 375/350 |
| 2020/0278431 A1 | * | 9/2020 | Zhu | G01S 17/10 |

* cited by examiner

Primary Examiner — Dac V Ha (57) ABSTRACT

Methods, PHYs, and computer-readable media are provided for reliably receiving data at a physical layer transceiver of an automobile in the presence of noise or interference. A non-equalized signal is received at a physical layer transceiver via a communication channel in a high noise or interference automotive environment. The non-equalized signal is prepared for extraction of data by performing one or more of the following: improving a signal-to-noise ratio of the non-equalized signal by using two or more parallel matching filters to correlate the non-equalized signal with two or more signal templates to detect the presence of logic low signal patterns and logic high signal patterns in the non-equalized signal; reducing jitter in the non-equalized signal by tracking a phase of the non-equalized signal using a digital timing loop; compensating for noise or interference distortion in the non-equalized signal by selecting a decision sample defined by a plurality of peaks, the selecting performed based on tracking peaks in the non-equalized signal; searching the non-equalized signal for a preamble before initiating a process of receiving payload data, to reduce false data reception caused by noise or interference; and extracting data from the prepared non-equalized signal.

20 Claims, 8 Drawing Sheets

PHYSICAL LAYER TRANSCEIVER WITH INCREASED NOISE AND INTERFERENCE TOLERANCE AND REDUCED LOSS

CROSS-REFERENCE TO RELATED APPLICATIONS

This disclosure claims the benefit under 35 U.S.C. § 119(e) of commonly-assigned United States Provisional Patent Applications Nos. 63/152,224, filed on Feb. 22, 2021; and 63/304,146 filed on Jan. 28, 2022. Each of the aforementioned provisional patent applications is hereby incorporated by reference herein in its respective entirety.

FIELD OF USE

This disclosure relates to communication networks and, more particularly, to physical layer transceivers, methods, and computer-readable media for receiving data in the presence of interference.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

Ethernet is designed to support the transmission and receipt of Ethernet frames at a rate of ten megabits per second (10 Mb/s) across a variety of applications. Ethernet uses physical layer transceivers (PHYs), such as 10BASE-T1S, as defined by the Institute of Electrical and Electronics Engineers 802.3cg Ethernet standard. 10BASE-T1S PHYs are called upon to operate in severely constrained environments, such as automotive and industrial environments in which certain requirements (e.g., electromagnetic compatibility) must be met despite the presence of high levels of electromagnetic interference and other types of noise and despite that automotive PHYs often are not equipped with equalizers.

It is desirable for 10BASE-T1S PHYs to reliably and efficiently receive data via a communication channel despite the presence of electromagnetic or other types of noise and/or interference.

SUMMARY

Embodiments described herein provide systems and methods for reliably receiving data at a physical layer transceiver in the presence of interference. According to one such method, a non-equalized signal is received at a physical layer transceiver via a communication channel in a high noise or interference automotive environment. The non-equalized signal is prepared for extraction of data by performing one or more of the following: improving a signal-to-noise ratio of the non-equalized signal by using two or more parallel matching filters to correlate the non-equalized signal with two or more signal templates to detect the presence of logic low signal patterns and logic high signal patterns in the non-equalized signal; reducing jitter in the non-equalized signal by tracking a phase of the non-equalized signal using a digital timing loop; compensating for noise or interference distortion in the non-equalized signal by selecting a decision sample defined by a plurality of peaks, the selecting performed based on tracking peaks in the non-equalized signal; and searching the non-equalized signal for a preamble before initiating a process of receiving payload data, to reduce false data reception caused by noise or interference. Data is then extracted from the prepared non-equalized signal.

In a further aspect, reducing jitter in the non-equalized signal comprises detecting, using a timing error detector, a timing error based on the non-equalized signal received at the physical layer transceiver; and adjusting, using a phase interpolator, a sample clock phase of an analog-to-digital converter sample clock to compensate for the timing error. Improving the signal-to-noise ratio of the non-equalized signal comprises generating, using the matching filters, filtered signals based on the non-equalized signal received at the physical layer transceiver. The method further comprises generating, using a Differential Manchester Encoding (DME) decoder, a decoded signal based on the filtered signal, Compensating for noise or interference distortion in the non-equalized signal comprises detecting, using peak search circuitry, peak values in the filtered signal; tracking, using peak tracking circuitry, the peak values to identify an optimal value among the peak values; and synchronizing a sample phase used by data select circuitry based on the identified optimal value. Extracting data from the prepared non-equalized signal comprises selecting, using the data select circuitry, a logic zero or a logic one based on the decoded signal and the sample phase.

In a further aspect, generating the filtered signal further comprises feeding in parallel the non-equalized signal received at the physical layer transceiver through a first sub-filter having coefficients shaped to correspond to a logic zero pattern and through a second sub-filter having coefficients shaped to correspond to a logic one pattern; and computing, as the filter signal, a difference between absolute values of outputs of the first sub-filter and the second sub-filter.

In a further aspect, the coefficients of the first sub-filter and the coefficients of the second sub-filter are selected based on an oversampling factor.

In a further aspect, generating the decoded signal further comprises outputting a logic zero based on detection of positive peaks, and outputting a logic one based on detection of negative peaks and their distances to nearest positive peaks.

In a further aspect, the method further comprises detecting the preamble based at least in part on the selected logic zero or the logic one and, in response to detecting the preamble, enabling the operation of one or more of the timing error detector, the phase interpolator, the matching filters, the DME decoder, the peak search circuitry, the peak tracking circuitry, or the data select circuitry until data receipt is completed.

In a further aspect, detecting the preamble comprises detecting a pattern of logic zero and logic one values, the physical layer transceiver being prevented from receiving data until the preamble is detected to mitigate false data reception caused by noise or interference.

In a further aspect, the method further comprises managing power consumption of the physical layer transceiver by detecting presence or absence of a data signal in the non-equalized signal based on whether the logic zero or the logic one is selected; in response to detecting the presence of the data signal in the non-equalized signal, enabling operation of one or more of the timing error detector, the phase interpolator, the matching filter, the DME decoder, the peak search circuitry, the peak tracking circuitry, the data select circuitry; and, in response to detecting absence of the data signal in the non-equalized signal, disabling operation of one or more of the timing error detector, the phase interpolator, the matching filter, the DME decoder, the peak search circuitry, the peak tracking circuitry, the data select circuitry.

In a further aspect, tracking the peak values comprises selecting, as the optimal value, a value having a greatest magnitude from among the peak values.

In a further aspect, the method further comprises performing, at boundary alignment circuitry, boundary alignment based on the selected logic one or logic zero and outputting a signal derived from the boundary alignment to physical coding sublayer circuitry.

In accordance with another aspect, a physical layer transceiver (PHY) is provided for reliably receiving data at a physical layer transceiver of an automobile in the presence of noise or interference. The PHY comprises matching filters, a digital timing loop, and control circuitry. The matching filters are configured to improve a signal-to-noise ratio of a non-equalized signal received at a physical layer transceiver via a communication channel in a high noise or interference automotive environment. The digital timing loop is configured to reduce jitter in the non-equalized signal by tracking a phase of the non-equalized signal using a digital timing loop. The control circuitry is configured to compensate for noise or interference distortion in the non-equalized signal by selecting a decision sample defined by a plurality of peaks, the selecting performed based on tracking peaks in the non-equalized signal; search the non-equalized signal for a preamble before initiating a process of receiving payload data, to reduce false data reception caused by noise or interference; and extract data from the non-equalized signal in the high noise or interference automotive environment, by utilizing a combination of the matching filters, the digital timing loop, the peak tracking algorithm, and the preamble search.

In a further aspect, the digital timing loop comprises a timing error detector configured to detect a timing error based on a non-equalized signal received at the physical layer transceiver via a communication channel; and a phase interpolator configured to adjust a sample clock phase of an analog-to-digital converter sample clock to compensate for the timing error. The matching filters are further configured to generate a filtered signal based on the non-equalized signal received at the physical layer transceiver. The PHY further comprises a Differential Manchester Encoding (DME) decoder configured to generate a decoded signal based on the filtered signal; peak search circuitry configured to detect peak values in the filtered signal; peak tracking circuitry configured to track the peak values to identify an optimal value among the peak values; and data select circuitry configured to utilize a sample phase synchronized based on the identified optimal value to select a logic zero or a logic one based on the decoded signal.

In a further aspect, the matching filter is configured to generate the filtered signal by feeding in parallel the non-equalized signal received at the physical layer transceiver through a first sub-filter having coefficients shaped to correspond to a logic zero pattern and through a second sub-filter having coefficients shaped to correspond to a logic one pattern; and computing, as the filter signal, a difference between absolute values of outputs of the first sub-filter and the second sub-filter.

In a further aspect, the coefficients of the first sub-filter and the coefficients of the second sub-filter are selected based on an oversampling factor.

In a further aspect, the DME decoder is configured to generate the decoded signal by outputting a logic zero based on detection of positive peaks, and outputting logic one based on detection of negative peaks and their distances to nearest positive peaks.

In a further aspect, the control circuitry is further configured to detect the preamble based at least in part on the selected logic zero or the logic one; and, in response to detecting the preamble, enable the operation of one or more of the timing error detector, the phase interpolator, the matching filters, the DME decoder, the peak search circuitry, the peak tracking circuitry, or the data select circuitry until data receipt is completed until data receipt is completed.

In a further aspect, the control circuitry is further configured to detect the preamble by detecting a pattern of logic zero and logic one values, and prevent the physical layer transceiver from receiving data until the preamble is detected to mitigate false data reception caused by noise or interference.

In a further aspect, the PHY further comprises control circuitry configured to manage power consumption of the physical layer transceiver by detecting presence or absence of a data signal in the non-equalized signal based on whether the logic zero or the logic one is selected; in response to detecting the presence of the data signal in the non-equalized signal, enabling operation of one or more of the timing error detector, the phase interpolator, the matching filter, the DME decoder, the peak search circuitry, the peak tracking circuitry, the data select circuitry; and, in response to detecting absence of the data signal in the non-equalized signal, disabling operation of one or more of the timing error detector, the phase interpolator, the matching filter, the DME decoder, the peak search circuitry, the peak tracking circuitry, the data select circuitry.

In a further aspect, the peak tracking circuitry is configured to track the peak values by selecting, as the optimal value, a value having a greatest magnitude from among the peak values.

In a further aspect, the PHY further comprises boundary alignment circuitry configured to perform boundary alignment based on the selected logic one or logic zero and output a signal derived from the boundary alignment to physical coding sublayer circuitry.

In accordance with another aspect, a non-transitory computer-readable medium is provided, having instructions stored thereon that, when executed by control circuitry, cause the control circuitry to: receive a non-equalized signal at a physical layer transceiver via a communication channel in a high noise or interference automotive environment; prepare the non-equalized signal for extraction of data by performing one or more of the following: improving a signal-to-noise ratio of the non-equalized signal using two or more matching filters; reducing jitter in the non-equalized signal by tracking a phase of the non-equalized signal using a digital timing loop; compensating for noise or interference distortion in the non-equalized signal by selecting a decision sample defined by a plurality of peaks, the selecting performed based on tracking peaks in the non-equalized signal; searching the non-equalized signal for a preamble before initiating a process of receiving payload data, to reduce false data reception caused by noise or interference; and extracting data from the prepared non-equalized signal.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

In accordance with implementations of the present disclosure, PHY transceivers, methods, and computer-readable media are disclosed for reliably and efficiently receiving data via a communication channel despite the presence of electromagnetic or other types of noise and/or interference. Among other advantages over prior approaches, the transceivers, methods, and computer-readable media herein employ an efficient power management scheme, realize an improved signal-to-noise ratio (SNR) despite the presence of interference by performing DME decoding based on a difference between matching filter outputs, select an optimal decision sample by using a peak tracking algorithm, reduce false reception by searching for a preamble before receiving data, and track phase and reduce jitter caused by the interference by using a digital timing loop (DTL).

Figure 1:
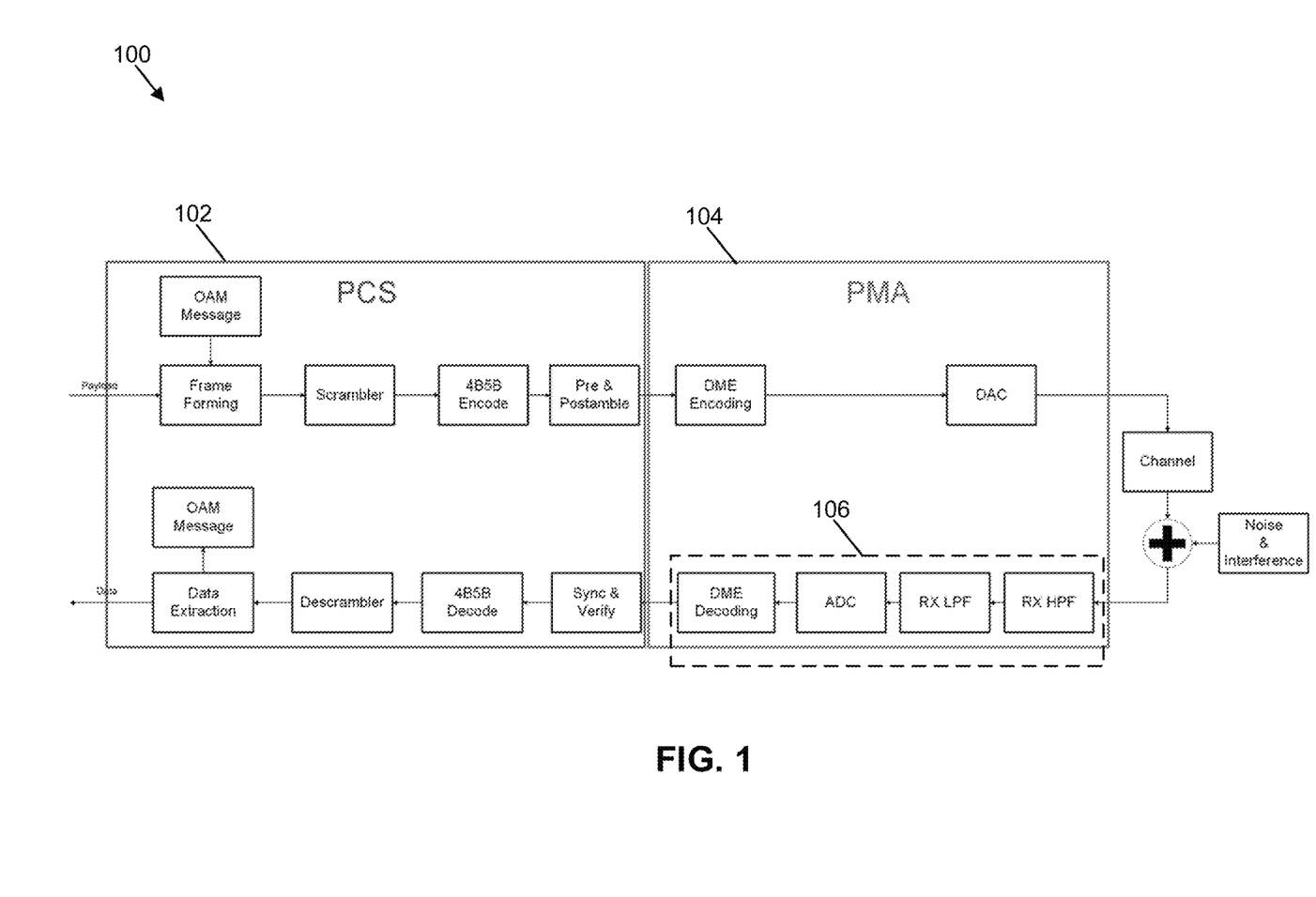
FIG. 1 is a schematic representation of physical coding sublayer (PCS) and physical medium attachment (PMA) components of a physical layer transceiver, in accordance with an embodiment of the present disclosure.

FIG. 1 is a schematic representation of physical coding sublayer (PCS) 102 and physical medium attachment (PMA) 104 components of a physical layer transceiver 100, in accordance with an embodiment of the present disclosure. PCS 102 is a known networking protocol sublayer in the various Ethernet standards. It resides at the top of the physical layer (PHY), and provides an interface between the PMA sublayer and the media-independent interface (MII). It is responsible for data encoding and decoding, scrambling and descrambling, alignment marker insertion and removal, block and symbol redistribution, and lane block synchronization and de-skew. PMA 104 performs PMA framing and byte synchronization/detection, as well as a variety of other functions, as described in further detail below in connection with FIGS. 2 through 8. PMA 104 includes a PMA receive chain 106, which includes various components that are described in further detail below.

Figure 2:
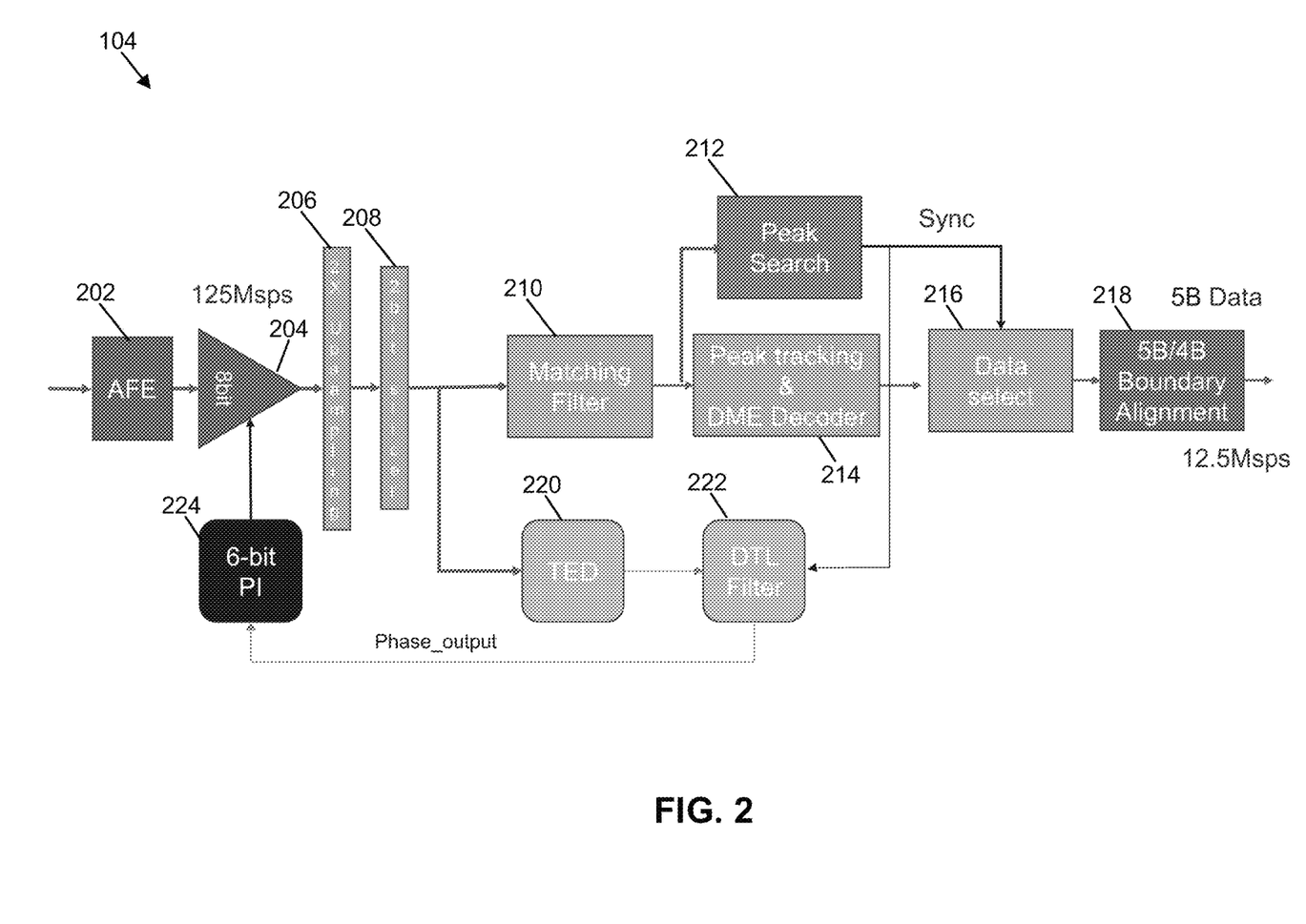
FIG. 2 is a block diagram showing aspects of a PMA receive chain of a physical layer transceiver, in accordance with an embodiment of the present disclosure.

FIG. 2 is a block diagram showing additional components of PMA receive chain 106 of a physical layer transceiver, in accordance with an embodiment of the present disclosure. PMA receive chain 106 includes an analog front end (AFE) 202, an 8-bit 125 mega-samples per second (Msps) analog-to-digital converter (ADC) 204, an up-sampler 206, a 2-bit slicer 208, a matching filter 210, peak search circuitry 212, peak tracking circuitry and DME decoder 214, data select circuitry 216, boundary alignment circuitry 218 (e.g., for 5B/4B boundary alignment), and a digital timing loop that includes a timing error detector (TED) 220, a digital timing loop (DTL) filter 222, and a 6-bit phase interpolator (PI) 224. AFE 202 is analog signal conditioning circuitry that uses analog amplifiers, filters, and/or the like to condition a received non-equalized signal into a form (e.g., at an appropriate signal level) suitable for ADC 204. ADC 204 converts the analog signal received from AFE 202 into a digital signal for subsequent digital signal processing. Up-sampler 206 up-samples a sequence of digital signal samples received from ADC 204 to produce an approximation of the sequence that would have been obtained by sampling the signal at a higher rate (e.g., two or more multiples of the rate at which ADC 204 samples the analog signal from AFE 202). 2-bit slicer 208 is an optional component that slices digital samples from up-sampler 206 into slices of a fixed number of bits, to facilitate processing of data in smaller bit widths. Matching filters 210 improve a signal-to-noise ratio of the non-equalized signal received from ADC 204 (or from 2-bit slicer 208 in embodiments that include slicer 208) by correlating the non-equalized signal with two or more signal templates to detect the presence of logic low signal patterns and logic high signal patterns in the non-equalized signal and generating a filtered signal for output. DME decoder 214 performs DME decoding on the filtered signal and generates for output a decoded signal.

Peak search circuitry 212, peak tracking circuitry 214, and data select circuitry 216 cooperate with one another to compensate for noise or interference distortion in the non-equalized signal. In particular, peak search circuitry 212 detects peak values in the filtered signal from matching filters 210. Peak tracking circuitry 214 tracks the peak values in the non-equalized signal to identify an optimal value among the peak values. Data select circuitry 216 selects a decision sample defined by a plurality of peaks, based on the peak tracking, extracts logic high and logic low signals values from the selected decision sample, and forwards the extracted data to boundary alignment circuitry. Boundary alignment circuitry 218 (e.g., for 5B/4B boundary alignment) performs boundary alignment in a known manner to align the boundaries of the data received from data select circuitry 216 (e.g., to map five-bit data values to four-bit data values), and outputs the boundary aligned signal to PCS 102 for processing.

TED 220, a DTL filter 222, and PI 224 form a digital timing loop. Timing error detector 220 detects a timing error based on the signal received at the physical layer transceiver. DTL filter 222 is a low-pass filter that filters out high frequency noise from the signal that was received at the physical layer transceiver, after detection of the timing error, if any, to keep only the error in the digital timing loop to enable correction of the sample phase. Phase interpolator 224 adjusts a sample clock phase of a sample clock used by ADC converter 204, for example, within fine increments of plus or minus 100 parts per million, to compensate for the timing error.

Figure 3:
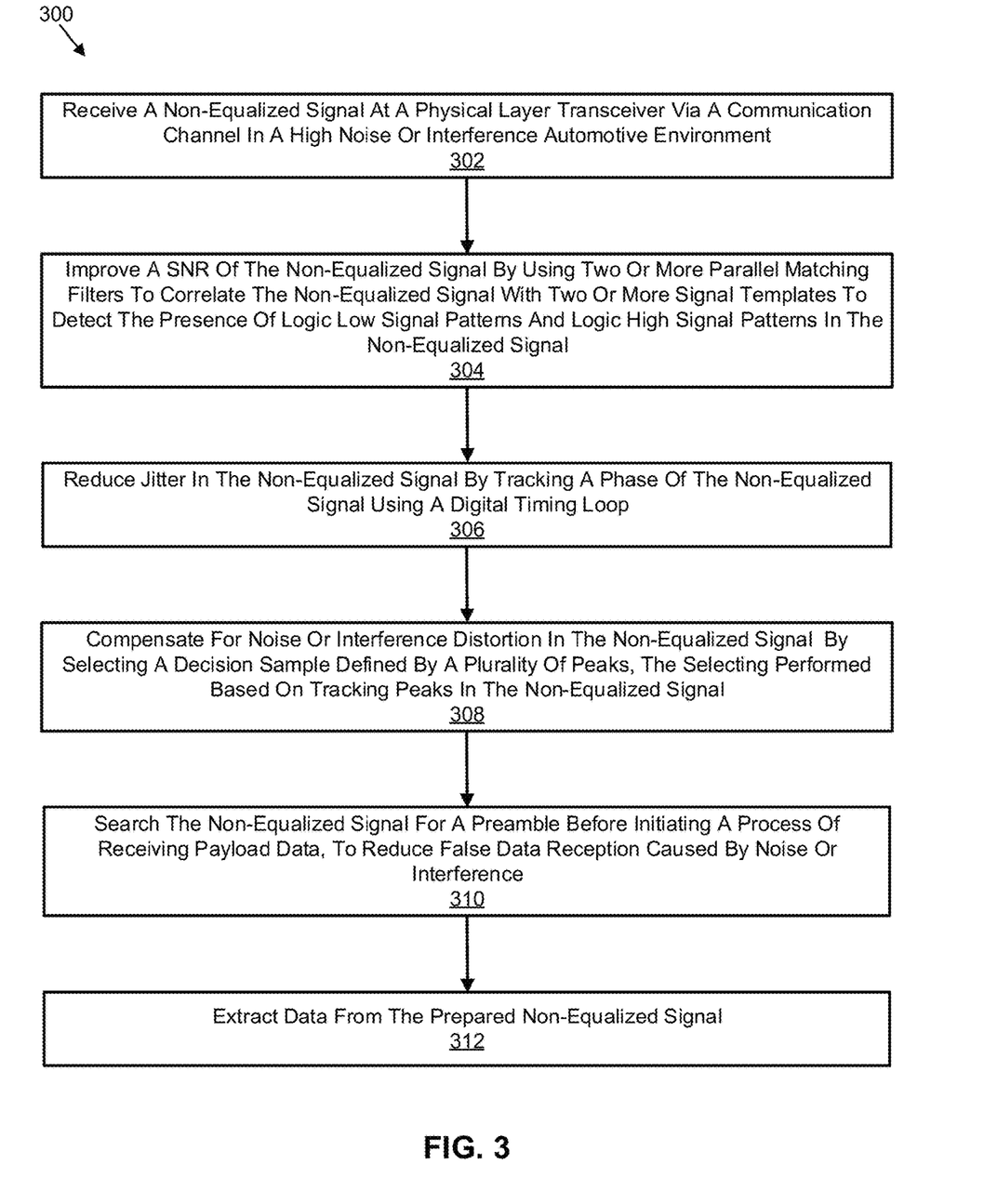
FIG. 3 is a flow diagram illustrating a method according to implementations of the subject matter of the present disclosure.

FIG. 3 is a flow diagram illustrating a method 300 for reliably receiving data at a physical layer transceiver of an automobile in the presence of noise or interference, according to implementations of the subject matter of the present disclosure. At 302, a physical layer transceiver (e.g., PHY 100) receives at AFE 202 a non-equalized signal via a communication channel in a high noise or interference automotive environment. PHY 100 (or control circuitry thereof, not separately shown in the figures) then prepares the non-equalized signal for extraction of data by performing one or more of the following steps. At 304, PHY 100 improves a signal-to-noise ratio of the non-equalized signal by using two or more parallel matching filters to correlate the non-equalized signal with two or more signal templates to detect the presence of logic low signal patterns and logic high signal patterns in the non-equalized signal. Matching filter 210 generates a filtered signal based on the signal received at the physical layer transceiver 100. DME decoder 214 generates a decoded signal based on the filtered signal.

At 306, PHY 100 reduces jitter in the non-equalized signal by tracking a phase of the non-equalized signal using a digital timing loop. The digital timing loop, which includes TED 220, a DTL filter 222, and PI 224, generally operates to track and correct for the phase or frequency offset or jitter, if any, that exists (in some cases owing to noise and/or interference) between a transmitter clock of another PHY on the network that is transmitting data on the bus and the clock that the receiver PHY 100 is using, to maintain synchronization between transmitter and receiver clocks. Jitter or offset in phase or frequency of transmitter and receiver clocks increases bit error rate (BER) and decreases SNR. Synchronizing transmitter and receiver clocks in the manner described above utilizing the DTL loop has the advantage of reducing BER and causing an improvement in SNR. Timing error detector 220 detects a timing error based on the signal received at the physical layer transceiver. DTL filter 222 is a low-pass filter that filters out high frequency noise from the signal that was received at the physical layer transceiver, after detection of the timing error, if any, to keep only the error in the digital timing loop to enable correction of the sample phase. Phase interpolator 224 adjusts a sample clock phase of a sample clock used by ADC converter 204, for example, within fine increments of plus or minus 100 parts per million, to compensate for the timing error (e.g., to mitigate the impact of jitter).

At 308, PHY 100 compensates for noise or interference distortion in the non-equalized signal by detecting, at peak search circuitry 212, peak values in the filtered signal and selecting, at data select circuitry 216, a decision sample defined by a plurality of peaks, the selecting being performed based on tracking, at peak tracking circuitry 214, the peak values in the non-equalized signal to identify an optimal value among the peak values.

At 310, PHY 100 (e.g., control circuitry thereof) searches the non-equalized signal for a preamble before initiating a process of receiving payload data, to reduce false data reception caused by noise or interference. At 312, PHY 100 extracts data from the prepared non-equalized signal. Boundary alignment circuitry 218 performs boundary alignment based on the selected logic one or logic zero and outputs a signal derived from the boundary alignment to PCS 102.

Figure 4:
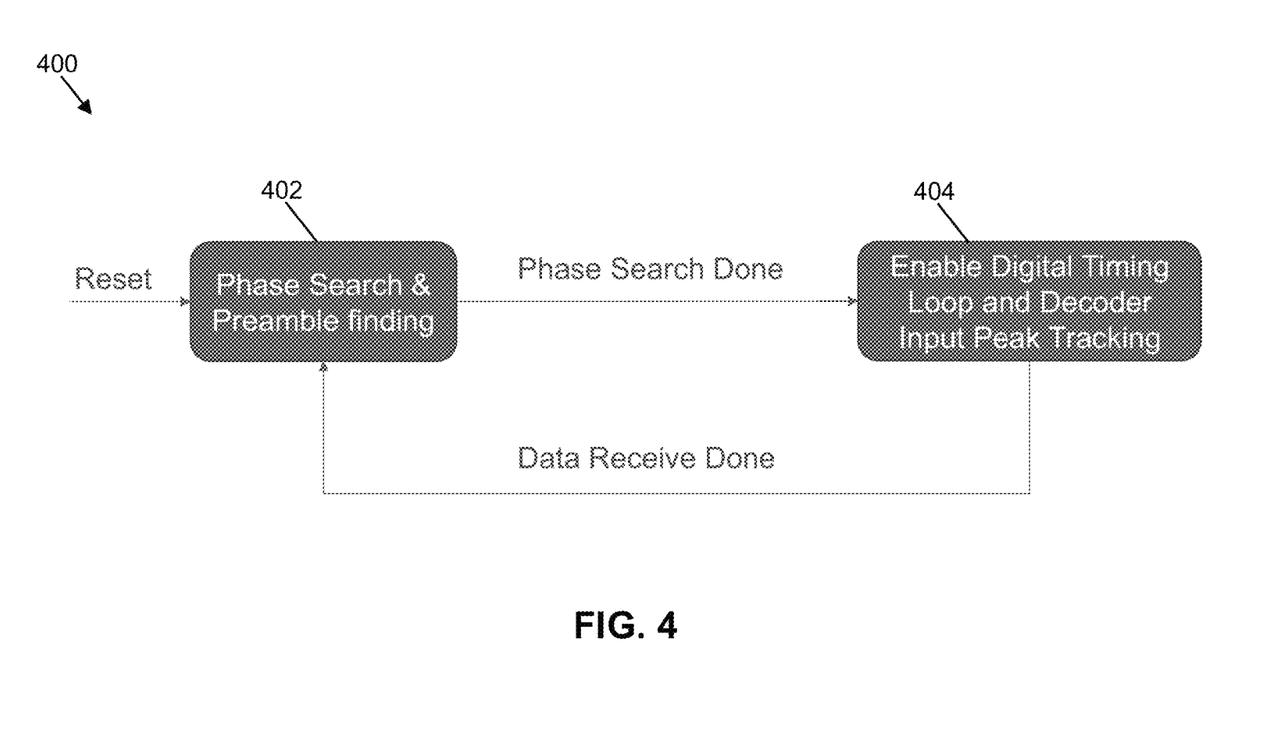
FIG. 4 is a schematic representation of further aspects of a PMA receive chain of a physical layer transceiver, in accordance with an embodiment of the present disclosure.

FIG. 4 is a block diagram showing additional control circuitry 400 that may be included in PMA receive chain 106, in accordance with an embodiment of the present disclosure. In some embodiments, control circuitry 400 manages power consumption of the physical layer transceiver by detecting the presence or the absence of a data signal based on whether data (as opposed to merely noise or interference) is detected (e.g., extracted) in the non-equalized signal received by data select circuitry 216. In particular, control circuitry 400 includes a phase search and module 402 that conducts phase searching and preamble searching of non-equalized signals received at PHY 100, and module 404 that, after the phase search has been completed and the preamble has been found in the non-equalized signal, selectively enables the operation of DTL and decoder input peak tracking. More specifically, in response to detecting the presence of the data signal, module 404 enables operation of timing error detector 220, DTL filter 222, phase interpolator 224 (DTL loop), matching filter 210, DME decoder 214, peak search circuitry 212, peak tracking circuitry 214, and data select circuitry 216. In response to detecting the absence of a data signal, or after receipt/extraction of data is completed and merely noise or interference is present on the non-equalized signal received at PHY 100, module 404 conducts a reset by disabling operation of timing error detector 220, DTL filter 222, phase interpolator 224 (DTL loop), matching filter 210, DME decoder 214, peak search circuitry 212, peak tracking circuitry 214, and data select circuitry 216.

Figure 5:
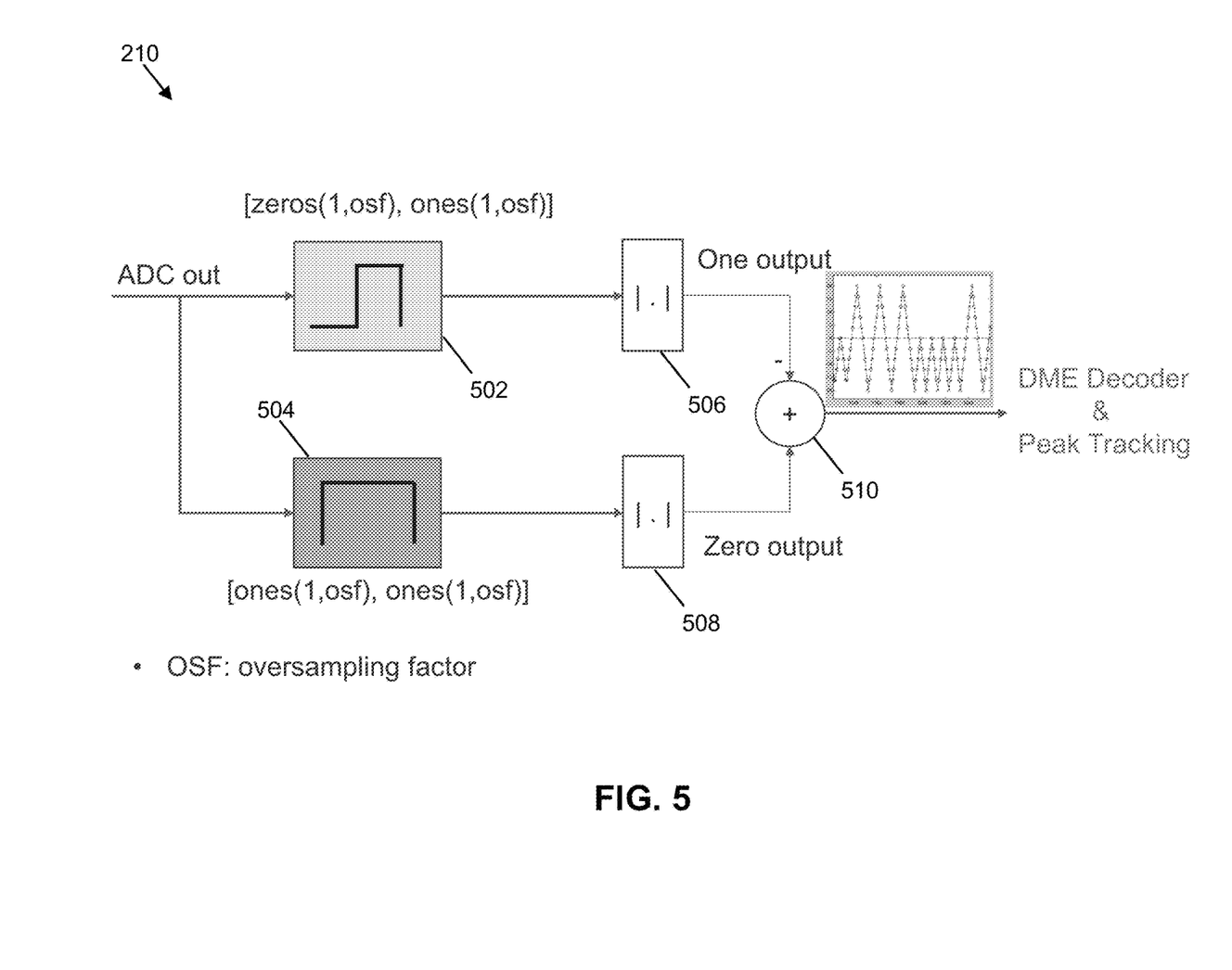
FIG. 5 is a schematic representation of aspects of a matching filter of a physical layer transceiver, in accordance with an embodiment of the present disclosure.

FIG. 5 is a schematic representation of matching filters 210 of a physical layer transceiver, in accordance with an embodiment of the present disclosure. Matching filters 210 improve a signal-to-noise ratio of the non-equalized signal received from ADC 204 (or from 2-bit slicer 208 in embodiments that include slicer 208) by correlating the non-equalized signal with two or more signal templates (one signal template that is defined by filter coefficients that correspond to a logic zero pattern and another signal template that is defined by filter coefficients that correspond to a logic one pattern) to detect the presence of logic zero (low) signal patterns and logic one (high) signal patterns in the non-equalized signal and generating a filtered signal for output. In particular, the signal received at the physical layer transceiver 100 is fed from ADC 204 (or from 2-bit slicer 208 in embodiments that include slicer 208) in parallel through a first sub-filter 502 having coefficients shaped to correspond to a logic zero pattern and through a second sub-filter 504 having coefficients shaped to correspond to a logic one pattern (e.g., the patterns being defined in accordance with known patterns of logic low and logic high DME signals).

The coefficients of the first sub-filter 502 and the coefficients of the second sub-filter 504, in some aspects, are selected based on an oversampling factor to achieve a higher resolution. For instance, in one example, the coefficients of first sub-filter 502, which correspond to a logic one output, include a sequence of zeros followed by a sequence of ones (e.g., a number of zeros equal to an oversampling factor followed by a number of ones equal to the oversampling factor); and the coefficients of second sub-filter 504, which correspond to a logic zero output, include a sequence of ones followed by another sequence of ones (e.g., a total number of ones equal to twice oversampling factor). The absolute magnitude of the output of the first sub-filter 502 is computed at component 506, and the absolute magnitude of the output of the second sub-filter 504 is computed at component 508, to render operation of matching filter 210 independent of the polarity of the non-equalized signal. Then the filter signal is computed at subtractor 510 as a difference between the absolute values outputted by components 508 and 506.

Figure 6:
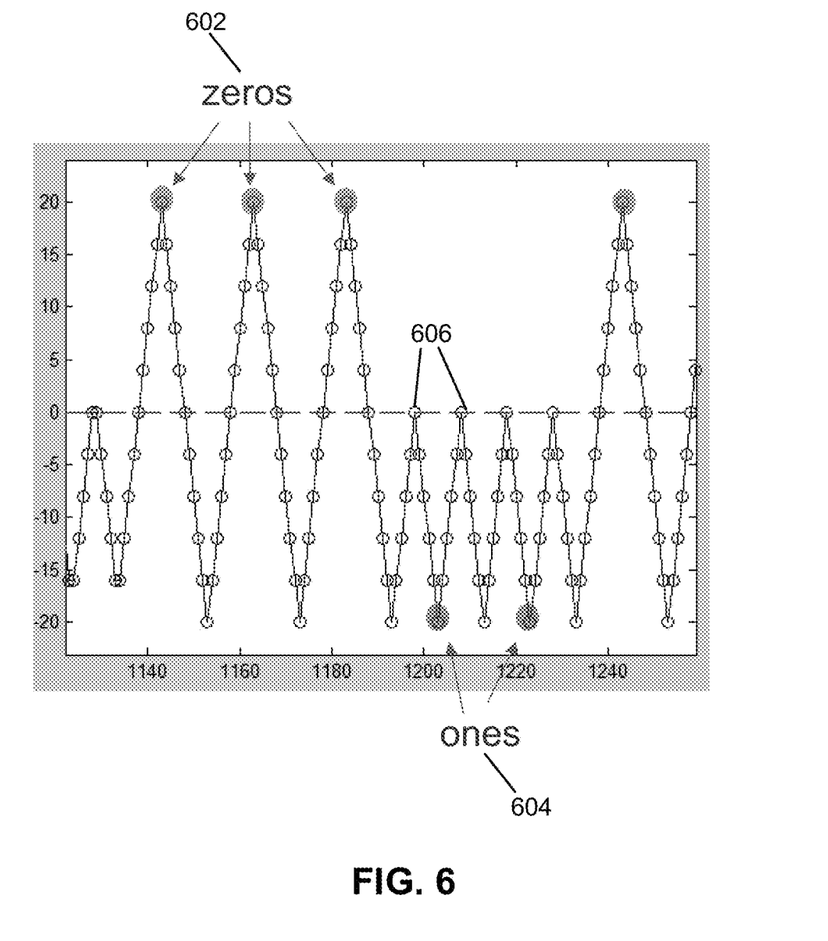
FIG. 6 is a graphical representation of how Differential Manchester Encoding (DME) decoding operates, in accordance with an embodiment of the present disclosure.

FIG. 6 is a graphical representation of how DME decoder 214 performs DME decoding on a signal received from matching filters 212, to generate a decoded signal (e.g., including logic ones and logic zeros) in accordance with an embodiment of the present disclosure. DME decoder 214 decodes the filtered signal by detecting positive peaks (e.g., positive peaks 602 in the filtered signal and outputting a respective logic zero based on detection of each positive peak. To detect a logic one, DME decoder analyzes the filtered signal to find negative peaks (e.g., negative peaks 604) that are located within a threshold temporal distance (e.g., a distance equal to one or a multiple of twice the oversampling factor that was used matching filters 212 to achieve higher resolution) from its nearest positive local peak (e.g., local positive peaks 606) in the filtered signal. In other words, DME decoder outputs a logic one for each negative peak (e.g., negative peak 604) that is located within the threshold temporal distance from a nearest local positive peak.

Figure 7:
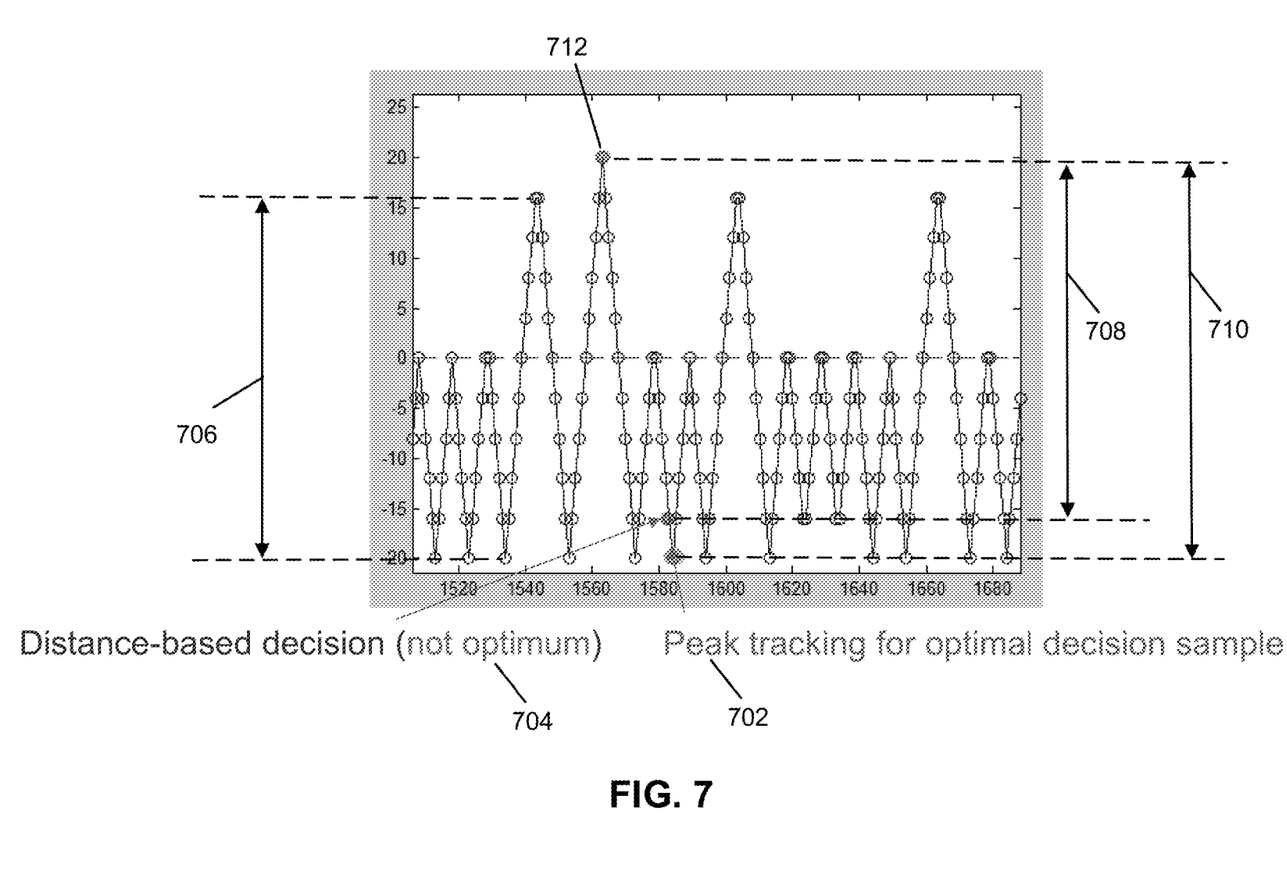
FIG. 7 is a graphical representation of how peak tracking operates, in accordance with an embodiment of the present disclosure.

FIG. 7 is a graphical representation of how peak tracking circuitry 214 performs peak tracking, in accordance with an embodiment of the present disclosure. The signal inputted to DME decoder 214 might not be ideal due to waveform distortion. In this case, a distance-based decision point (e.g., selecting a decision point based on its distance in magnitude from a previously detected peak) might not be optimum. For instance, in the example of FIG. 7, Distance 706 might be the expected typical distance in magnitude from a positive peak to a negative peak. Owing to distortion, however, peak 712 might have a higher value than it would without distortion. In this circumstance, DME decoder 214 might use point 704 as a selected decision point (e.g., by virtue of selecting a decision point that appears at the expected distance (distance 706, equal to distance 708) in magnitude from one another). Peak 704 as a lower (negative) magnitude than peak 702 and is therefore less optimal of a decision point than peak 702, since the higher the signal value, the greater the SNR. To compensate for this situation, peak tracking circuitry and DME decoder 214 track peak values and select, as the optimal value, a value (e.g., value 702) having a greatest magnitude from among the peak values (e.g., instead of selecting value 704 based on a sub-optimal temporal distance-based decision), even if the peak value 702 is located a distance (in magnitude) from peak 712 that differs from the expected distance. That is, in the example of FIG. 7, DME decoder 214 would select peak 702 instead of peak 704 as a decision point. By tracking peaks and selecting the decision points based on peak magnitudes, DME decoder 214 yields increased SNR performance, since a greater signal value is used for the given amount of noise.

Figure 8:
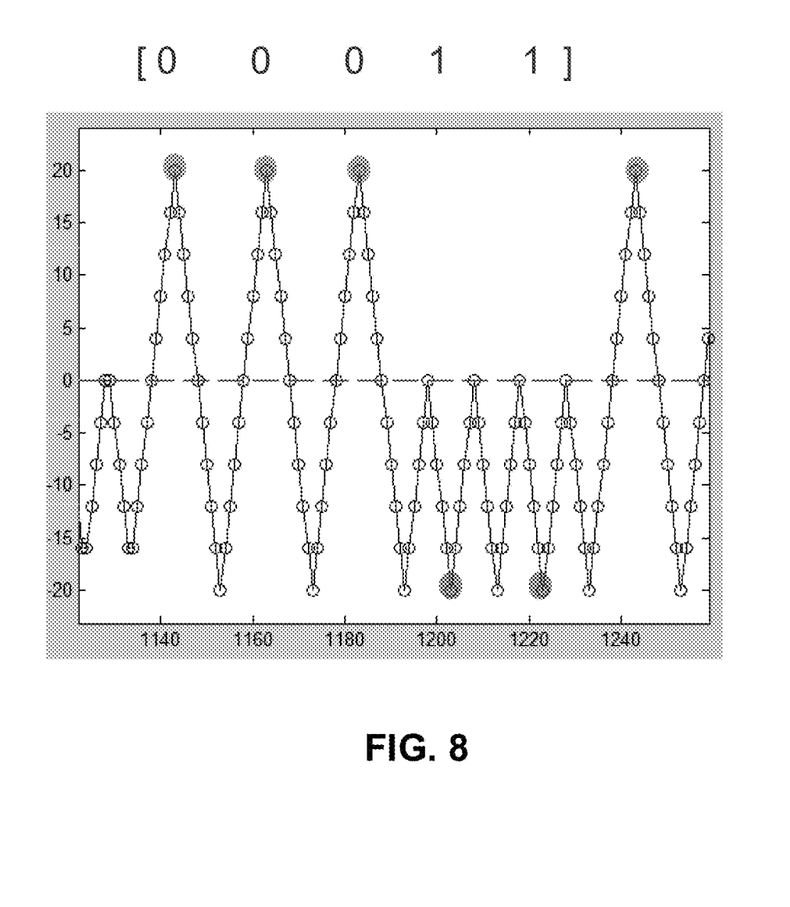
FIG. 8 is a graphical representation of how preamble searching operates, in accordance with an embodiment of the present disclosure.

FIG. 8 is a graphical representation of how preamble searching operates, in accordance with an embodiment of the present disclosure. The initial portion of an Ethernet frame is marked by a preamble, which is a predetermined fixed value and which forms part of the Ethernet packet at the physical layer. The preamble consists of a pattern (e.g., a seven byte pattern) of 1 and 0 bits that allows devices on a network to synchronize their receiver clocks, providing bit-level synchronization. In the example of FIG. 8, detecting the preamble includes detecting, at DME decoder 214 in the manner described above in connection with FIG. 6, a sequential pattern of logic zero and logic one values (e.g., 00011) in the sequence of logical bit values that DME decoder 214 receives from matching filters 212. DME decoder 214 detects the preamble in the sequence of logical bit values received from matching filters 212 by performing a sliding window bit-wise comparison between the bit values of the known preamble sequence and the bit values of each sequence (of the same number of bits as in the preamble sequence) received from matching filters 212 to determine whether the received bit sequence matches the preamble bit sequence. High amounts of noise and interference such as is often present in an automotive network environment give rise on the bus to random signal patterns, which can sometimes match patterns of data that might otherwise be expected to be transmitted on the bus by another PHY. In such circumstances, a receiving PHY might erroneously detect the random signal pattern caused by noise and interference as false data, or data transmitted by another PHY on the bus. Because the likelihood that noise and interference will give rise to a signal pattern that precisely matches an entire Ethernet preamble pattern (e.g., a seven byte pattern) is low, by preventing the physical layer transceiver from receiving data until the preamble is detected, false data reception caused by noise or interference is mitigated.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure without departing from the scope of the claims.

While operations are depicted in the drawings in a particular order, this is not to be construed as requiring that such operations be performed in the particular order shown or in sequential order, or that all illustrated operations be performed to achieve the desirable results.

What is claimed is:

1. A method for reliably receiving data at a physical layer transceiver of an automobile in the presence of noise or interference, the method comprising:

receiving a non-equalized signal at a physical layer transceiver via a communication channel in a high noise or interference automotive environment;

selecting, using data select circuitry, a logic zero or a logic one;

preparing the non-equalized signal for extraction of data by processing the non-equalized signal using the physical layer transceiver, the physical layer transceiver being configured to:

improve a signal-to-noise ratio of the non-equalized signal by using two or more parallel matching filters to correlate the non-equalized signal with two or more signal templates to detect the presence of logic low signal patterns and logic high signal patterns in the non-equalized signal;

reduce jitter in the non-equalized signal by tracking a phase of the non-equalized signal using a digital timing loop;

compensate for noise or interference distortion in the non-equalized signal by selecting a decision sample defined by a plurality of peaks, the selecting performed based on tracking peaks in the non-equalized signal; and before initiating a process of receiving payload data, to reduce false data reception caused by noise or interference, search the non-equalized signal for a preamble by detecting the preamble based at least in part on the selected logic zero or the logic one, wherein the physical layer transceiver is prevented from receiving data until the preamble is detected to mitigate false data reception caused by noise or interference; and extracting data from the prepared non-equalized signal.

2. The method for reliably receiving data claimed in claim 1, wherein:

preparing the non-equalized signal for extraction of data by processing the non-equalized signal using the physical layer transceiver comprises preparing the non-equalized signal for extraction of data by processing the non-equalized signal using the physical layer transceiver that has been configured to:
  reduce jitter in the non-equalized signal by:
    detecting, using a timing error detector, a timing error based on the non-equalized signal received at the physical layer transceiver; and
    adjusting, using a phase interpolator, a sample clock phase of an analog-to-digital converter sample clock to compensate for the timing error;
  improve the signal-to-noise ratio of the non-equalized signal by:
    generating, using the matching filters, a filtered signal based on the non-equalized signal received at the physical layer transceiver;
  compensate for noise or interference distortion in the non-equalized signal by:
    detecting, using peak search circuitry, peak values in the filtered signal;
    tracking, using peak tracking circuitry, the peak values to identify an optimal value among the peak values; and
    synchronizing a sample phase used by the data select circuitry based on the identified optimal value;
  the method further comprises generating, using a Differential Manchester Encoding (MDE) decoder, a decoded signal based on the filtered signal; and
  selecting, using the data select circuitry, a logic zero or a logic one is based on the decoded signal and the sample phase.

3. The method for reliably receiving data claimed in claim 2, wherein generating the filtered signal further comprises:
  feeding in parallel the non-equalized signal received at the physical layer transceiver through a first sub-filter having coefficients shaped to correspond to a logic zero pattern and through a second sub-filter having coefficients shaped to correspond to a logic one pattern; and
  computing, as the filter signal, a difference between absolute values of outputs of the first sub-filter and the second sub-filter.

4. The method for reliably receiving data claimed in claim 3, wherein the coefficients of the first sub-filter and the coefficients of the second sub-filter are selected based on an oversampling factor.

5. The method for reliably receiving data claimed in claim 3, wherein generating the decoded signal further comprises outputting a logic zero based on detection of positive peaks, and outputting a logic one based on detection of negative peaks and their distances to nearest positive peaks.

6. The method for reliably receiving data claimed in claim 2, wherein preparing the non-equalized signal for extraction of data by processing the non-equalized signal using the physical layer transceiver comprises preparing the non-equalized signal for extraction of data by processing the non-equalized signal using the physical layer transceiver that has been further configured to:
  in response to detecting the preamble, enable the operation of one or more of the timing error detector, the phase interpolator, the matching filters, the DME decoder, the peak search circuitry, the peak tracking circuitry, or the data select circuitry until data receipt is completed.

7. The method for reliably receiving data claimed in claim 6, wherein preparing the non-equalized signal for extraction of data by processing the non-equalized signal using the physical layer transceiver comprises preparing the non-equalized signal for extraction of data by processing the non-equalized signal using the physical layer transceiver that has been further configured to detect the preamble by detecting a pattern of logic zero and logic one values.

8. The method for reliably receiving data claimed in claim 2, further comprising managing power consumption of the physical layer transceiver by:
  detecting presence or absence of a data signal in the non-equalized signal based on whether the logic zero or the logic one is selected;
  in response to detecting the presence of the data signal in the non-equalized signal, enabling operation of one or more of the timing error detector, the phase interpolator, the matching filter, the DME decoder, the peak search circuitry, the peak tracking circuitry, the data select circuitry; and
  in response to detecting absence of the data signal in the non-equalized signal, disabling operation of one or more of the timing error detector, the phase interpolator, the matching filter, the DME decoder, the peak search circuitry, the peak tracking circuitry, the data select circuitry.

9. The method for reliably receiving data claimed in claim 2, wherein tracking the peak values comprises selecting, as the optimal value, a value having a greatest magnitude from among the peak values.

10. The method for reliably receiving data claimed in claim 2, wherein preparing the non-equalized signal for extraction of data by processing the non-equalized signal using the physical layer transceiver comprises preparing the non-equalized signal for extraction of data by processing the non-equalized signal using the physical layer transceiver that has been further configured to perform, at boundary alignment circuitry, boundary alignment based on the selected logic one or logic zero and outputting a signal derived from the boundary alignment to physical coding sublayer circuitry.

11. A physical layer transceiver for reliably receiving data at a physical layer transceiver of an automobile in the presence of noise or interference, the physical layer transceiver comprising:
  matching filters configured to improve a signal-to-noise ratio of a non-equalized signal received at a physical layer transceiver via a communication channel in a high noise or interference automotive environment;
  a digital timing loop configured to reduce jitter in the non-equalized signal by tracking a phase of the non-equalized signal using a digital timing loop; and
  control circuitry configured to:
    compensate for noise or interference distortion in the non-equalized signal by selecting a decision sample defined by a plurality of peaks, the selecting performed based on tracking peaks in the non-equalized signal;
    search the non-equalized signal for a preamble before initiating a process of receiving payload data, to reduce false data reception caused by noise or interference; and
    extract data from the non-equalized signal in the high noise or interference automotive environment, by utilizing a combination of the matching filters, the digital timing loop, the peak tracking algorithm, and the preamble search.

12. The physical layer transceiver claimed in claim 11, wherein the digital timing loop comprises:

a timing error detector configured to detect a timing error based on a non-equalized signal received at the physical layer transceiver via a communication channel; and a phase interpolator configured to adjust a sample clock phase of an analog-to-digital converter sample clock to compensate for the timing error;

wherein the matching filters are configured to generate a filtered signal based on the non-equalized signal received at the physical layer transceiver; and wherein the physical layer transceiver further comprises:
a Differential Manchester Encoding (DME) decoder configured to generate a decoded signal based on the filtered signal;

peak search circuitry configured to detect peak values in the filtered signal;

peak tracking circuitry configured to track the peak values to identify an optimal value among the peak values; and data select circuitry configured to utilize a sample phase synchronized based on the identified optimal value to select a logic zero or a logic one based on the decoded signal.

13. The physical layer transceiver claimed in claim 12, wherein the matching filter is configured to generate the filtered signal by:
feeding in parallel the non-equalized signal received at the physical layer transceiver through a first sub-filter having coefficients shaped to correspond to a logic zero pattern and through a second sub-filter having coefficients shaped to correspond to a logic one pattern; and
computing, as the filter signal, a difference between absolute values of outputs of the first sub-filter and the second sub-filter.

14. The physical layer transceiver claimed in claim 13, wherein the coefficients of the first sub-filter and the coefficients of the second sub-filter are selected based on an oversampling factor.

15. The physical layer transceiver claimed in claim 13, wherein the DME decoder is configured to generate the decoded signal by outputting a logic zero based on detection of positive peaks, and outputting logic one based on detection of negative peaks and their distances to nearest positive peaks.

16. The physical layer transceiver claimed in claim 12, further comprising control circuitry configured to:
detect the preamble based at least in part on the selected logic zero or the logic one; and
in response to detecting the preamble, enable the operation of one or more of the timing error detector, the phase interpolator, the matching filters, the DME decoder, the peak search circuitry, the peak tracking circuitry, or the data select circuitry until data receipt is completed until data receipt is completed.

17. The physical layer transceiver claimed in claim 16, wherein the control circuitry is configured to detect the preamble by detecting a pattern of logic zero and logic one values, and wherein the control circuitry is configured to prevent the physical layer transceiver from receiving data until the preamble is detected to mitigate false data reception caused by noise or interference.

18. The physical layer transceiver claimed in claim 12, further comprising control circuitry configured to manage power consumption of the physical layer transceiver by:
detecting presence or absence of a data signal in the non-equalized signal based on whether the logic zero or the logic one is selected;
in response to detecting the presence of the data signal in the non-equalized signal, enabling operation of one or more of the timing error detector, the phase interpolator, the matching filter, the DME decoder, the peak search circuitry, the peak tracking circuitry, the data select circuitry; and
in response to detecting absence of the data signal in the non-equalized signal, disabling operation of one or more of the timing error detector, the phase interpolator, the matching filter, the DME decoder, the peak search circuitry, the peak tracking circuitry, the data select circuitry.

19. The physical layer transceiver claimed in claim 12, wherein the peak tracking circuitry is configured to track the peak values by selecting, as the optimal value, a value having a greatest magnitude from among the peak values.

20. A non-transitory computer-readable medium having instructions stored thereon that, when executed by control circuitry, cause the control circuitry to:
receive a non-equalized signal at a physical layer transceiver via a communication channel in a high noise or interference automotive environment;
select, using data select circuitry, a logic zero or a logic one;
prepare the non-equalized signal for extraction of data by processing the non-equalized signal using the physical layer transceiver, the physical layer transceiver being configured to:
improve a signal-to-noise ratio of the non-equalized signal using two or more matching filters;
reduce jitter in the non-equalized signal by tracking a phase of the non-equalized signal using a digital timing loop;
compensate for noise or interference distortion in the non-equalized signal by selecting a decision sample defined by a plurality of peaks, the selecting performed based on tracking peaks in the non-equalized signal; and
before initiating a process to receive payload data, to reduce false data reception caused by noise or interference, search the non-equalized signal for a preamble by detecting the preamble based at least in part on the selected logic zero or the logic one, wherein the physical layer transceiver is prevented from receiving data until the preamble is detected to mitigate false data reception caused by noise or interference; and
extracting data from the prepared non-equalized signal.

* * * * *